United States Patent
Lin et al.

(10) Patent No.: US 9,152,672 B2
(45) Date of Patent: *Oct. 6, 2015

(54) METHOD FOR STORAGE, QUERYING, AND ANALYSIS OF TIME SERIES DATA

(71) Applicant: General Electric Company, Schenectady, NY (US)

(72) Inventors: Jerry Lin, Latham, NY (US); Kareem Sherif Aggour, Niskayuna, NY (US); Brian Scott Courtney, Naperville, IL (US); John Alan Interrante, Scotia, NY (US); Christina Ann LaComb, Scdhenectady, NY (US); Sunil Mathur, East Walpole, MA (US); Christopher Thomas McConnell, Latham, NY (US); Quinn Snell, Salem, UT (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,560

(22) Filed: Dec. 17, 2012

(65) Prior Publication Data
US 2014/0172867 A1    Jun. 19, 2014

(51) Int. Cl.
*G06F 17/30* (2006.01)

(52) U.S. Cl.
CPC .... *G06F 17/30477* (2013.01); *G06F 17/30336* (2013.01); *G06F 17/30545* (2013.01); *G06F 17/30584* (2013.01); *G06F 17/30424* (2013.01)

(58) Field of Classification Search
CPC ............... G06F 17/30551; G06F 17/30545; G06F 17/30424; G06F 17/30584; G06F 17/30477; G06F 17/30336

USPC .......... 707/746, 999.107, 999.002, 741
See application file for complete search history.

(56) References Cited

U.S. PATENT DOCUMENTS

| | | | |
|---|---|---|---|
| 6,816,854 B2 * | 11/2004 | Reiner et al. | 707/770 |
| 7,024,414 B2 * | 4/2006 | Sah et al. | 1/1 |
| 7,370,030 B2 * | 5/2008 | Dettinger et al. | 1/1 |
| 7,979,439 B1 * | 7/2011 | Nordstrom et al. | 707/741 |
| 8,364,697 B2 * | 1/2013 | Matias et al. | 707/769 |
| 2003/0028509 A1 * | 2/2003 | Sah et al. | 707/1 |
| 2003/0084035 A1 * | 5/2003 | Emerick, III | 707/3 |

(Continued)

OTHER PUBLICATIONS

Nam, et al., "Spatial Indexing of Distributed Multidimensional Datasets", Cluster Computing and the Grid, 2005. CCGRID 2005. IEEE International Symposium on CARDIFF, vol. No. 9, pp. 743-750, May 9, 2005.*

(Continued)

*Primary Examiner* — Jean M Corrielus
(74) *Attorney, Agent, or Firm* — Schwegman Lundberg & Woessner, P.A.

(57) ABSTRACT

A method for performing queries on a distributed time series data storage system is presented. The time series data storage system has a time series database that stores data blocks containing time stamped data across a plurality of computing devices. The system also includes an index database that stores an index associated with the time stamped data in each data block. The method includes the steps of sending a query, requesting indices, returning the indices, preparing a sub-query, forwarding the sub-query to an evaluator, evaluating the sub-query, performing a logical operation on each sub-query's result, receiving the sub-results at an output handler, and combining the sub-results.

20 Claims, 5 Drawing Sheets

(56) References Cited

U.S. PATENT DOCUMENTS

| | | | |
|---|---|---|---|
| 2006/0224603 A1* | 10/2006 | Correll, Jr. ............... | 707/100 |
| 2007/0038596 A1* | 2/2007 | Pizzo et al. ............... | 707/2 |
| 2007/0250524 A1* | 10/2007 | Le ............................ | 707/102 |
| 2008/0059432 A1* | 3/2008 | Tan et al. .................. | 707/3 |
| 2009/0327217 A1* | 12/2009 | Matias et al. ............. | 707/2 |
| 2010/0100556 A1* | 4/2010 | Correll, Jr. ............... | 707/754 |
| 2011/0016127 A1* | 1/2011 | Uppala ...................... | 707/737 |
| 2011/0055215 A1* | 3/2011 | Uppala ...................... | 707/737 |
| 2011/0213778 A1* | 9/2011 | Hess et al. ................. | 707/740 |
| 2012/0197856 A1* | 8/2012 | Banka et al. ............... | 707/706 |
| 2013/0073589 A1* | 3/2013 | Smith et al. ............... | 707/770 |
| 2013/0191523 A1* | 7/2013 | Buck et al. ................. | 709/223 |
| 2014/0067792 A1* | 3/2014 | Erdogan et al. ............ | 707/718 |

OTHER PUBLICATIONS

Elmasri, et al., "Chapter 25: Distributed Databases", Fundamentals of Database Systems(Sixth Edition), pp. 877-927, Jan. 1, 2011.*

International Search Report and Written Opinion issued in connection with corresponding PCT Application No. PCT/US2013/071122 dated Sep. 3, 2014.

Madden et al., "Supporting aggregate queries over ad-hoc wireless sensor networks", Mobile Computing Systems and Applications, 2002. Proceedings Fourth IE EE Workshop on Jun. 20-21, 2002, Piscataway, pp. 49-58, Jun. 20, 2002, XP010592544.

Jeong et al., "Sensor-based Emissions Monitoring System", Information Science and Service Science and Data Mining (ISSDM), 2012 6th International Conference on New Trends in, IEEE, pp. 336-339, Oct. 23, 2012, XP032422802.

Wlodarczyk, "Overview of Time Series Storage and Processing in a Cloud Environment", Cloud Computing Technology and Science (Cloudcom), 2012 IEEE 4th International Conference on, IEEE, pp. 625-628, Dec. 3, 2012, XP032323242.

* cited by examiner

METHOD FOR STORAGE, QUERYING, AND ANALYSIS OF TIME SERIES DATA

TECHNICAL FIELD

The systems and techniques described include embodiments that relate to techniques and systems for storing, and retrieving time series data on large data systems. They also include embodiments that related to analysis and processing of such data.

BACKGROUND DISCUSSION

As the ability to connect devices together via electronic networks has increased, it has become more desirable to collect, transmit and store operational data for various systems so that such data can be used for analysis and optimization. For instance, industrial equipment often contains a variety of sensors that can monitor multiple parameters related to the operation and performance of the equipment many times per second. Such sensors rapidly produce a large volume of time series historical data points associated with the equipment.

Although such data can be very useful for determining how to better use the equipment, the volume of data produced often requires storage that is not located on, or even near, the equipment itself. When data from multiple related sources is stored (for instance, data related to each windmill in a wind farm), the volume of data produced over time grows even more quickly.

Although raw storage of such data merely requires a fast enough connection to a large enough storage array, raw storage of such time series data does not provide a structure that is amenable to easy retrieval of specific data. Furthermore, when the entire body of data needs to be searched in order to find data meeting specific criteria, brute force search methods will be too slow and resource intensive to provide effective results.

Therefore, in order to allow for effective storage and retrieval of such time series data, it may be desirable to provide a technique that allows for rapid storage as well as efficient search and retrieval of specified data from such systems. It may also be desirable to provide techniques for effective analytic capabilities of such large bodies of time series data stored in such systems.

BRIEF DESCRIPTION

In one aspect of an embodiment of a technique in accordance with the description herein, a method for performing queries on a distributed time series data storage systems is presented. The time series data storage system has a time series database that stores data blocks containing time stamped data across a plurality of computing devices. The system also includes an index database that stores an index associated with the time stamped data in each data block. The method includes the steps of sending a query, requesting indices, returning the indices, preparing a sub-query, forwarding the sub-query to an evaluator, evaluating the sub-query, performing a logical operation on each sub-query's result, receiving the sub-results at an output handler, and combining the sub-results.

Sending a query includes sending a query to a query layer running on a first computing device. The query specifies criteria that define a set of data to be retrieved from the time series data storage system and analysis to be performed on the set of data.

Requesting indices involves requesting from the index database the indices associated with the data blocks stored in the time series database that will be needed to evaluate the query. The indices are returned to the query layer.

A sub-query is prepared that, when run against the data blocks, will produce appropriate data matching the criteria. The sub-query includes both the criteria of the query and a logical operation to be performed on the data matching the criteria.

These sub-queries are forwarded to forwarding to an evaluator running on each of the plurality of computing devices that are identified in the returned indices as holding data corresponding to the data blocks needed to evaluate the query. Each evaluator evaluates the criteria specified in the sub-query with respect to the data blocks stored on the machine the evaluator is running on. This selects a subset specific to this computing device that corresponds the criteria.

The logical operation specified in the sub-query is then performed by each evaluator on the subset of data. This generates a sub-result, which is sent from each evaluator to an output handler. The output handler combines the sub-result from each evaluator into a query result.

In another aspect of a technique in accordance with an embodiment described herein, the time series data storage system described above includes a data generator and an ingester. The data generator produces the time stamped data. In yet another aspect of this technique the method includes receiving the time-stamped data from the data generator by the ingester, creating the data block and the index from the time-stamped data, sending the data block to the time series database for storage; and sending the index to the index database for storage.

In still another aspect of such a technique, the time series database is made up of a plurality of data nodes, each consisting of one of the plurality of computing devices specified above. Each data node stores specific data blocks. A control node is also included. The control node chooses which data node will store each data block and records which data blocks are stored on each of the plurality of data nodes to create a location map.

BRIEF DESCRIPTION OF DRAWING FIGURES

The above and other aspects, features, and advantages of the present disclosure will become more apparent in light of the subsequent detailed description when taken in conjunction with the accompanying drawings, wherein like elements are numbered alike in the several figures, and in which.

DETAILED DESCRIPTION

As discussed above, storage of increasingly large volumes of data that are generated during the operation of modern systems continues to stress storage and retrieval capabilities. For example, running a single power turbine can generate tens or hundreds of megabytes of data per day of operation. In addition to monitoring the values in real time for control purposes, it is desirable to be able to store such data so that the performance of the equipment can be analyzed over time. Such monitoring and storage can provide the ability to diagnose failures, schedule maintenance effectively, and predict the need for replacement of parts or entire turbines. In addition to being used locally with regard to a single machine, such as a turbine, such information can be passed to a central location for comparison across an entire fleet of equipment, such as turbines, railcars, trucks, jet engines, or any other asset which generates data. For instance, in a hospital, individual patients could be considered assets, and the medical monitoring equipment could be used to generate data describing their state over time.

However, in order to perform the desired analytics, the information must be not only be stored, preferably without having to decimate or otherwise degrade the original data, but it also should be stored in a way that preserves the critical information related to when the data was measured. Because the time at which a piece of data is captured is needed to properly assess this type of information, it is referred to as "time series" data.

Time series data can correspond to any measurements that are generally taken at a sampling rate, and for which the time of the measurement is noted and stored. As used herein, "sensor" will refer to any device which captures operating data related to some monitored asset. Such sensors can capture measurements related to the properties of an asset, whether those properties are physical such as vibration or speed, operational such as an operating mode or command status (such as a throttle setting), or circumstantial, such as location or ambient temperature. An "asset" can be anything for which periodic measurements are desired and are captured. Assets could include items from individual machines or portions of machines (turbine stages, for instance), to entire systems such as a power plant, or even systems of systems, such as a power grid. Another example of an asset could be a patient at a hospital who is undergoing tests, or who is connected to a monitoring system of some kind.

Storing the data generated by a set of assets requires that the information be passed to a storage system and stored as fast as, or faster than, it is generated. Failure to do so will ultimately result in a loss of data if the data is generated continuously. Although historically it was often possible for a single machine, or a small dedicated cluster of machines to receive and store such data in real time, the increased volumes of such data will eventually overwhelm any single machine, no matter how large or capable.

Therefore, it is desirable that any such system be capable of fast read and write performance so as to capture data from multiple assets in real time. In the described systems, one way to do this is to use a distributed storage system that makes use of a time series database that can be scaled across multiple computing devices. In such an embodiment, the storage architecture can be expanded by adding additional computing devices as needed if the total volume or data rate required increases.

Figure 1:
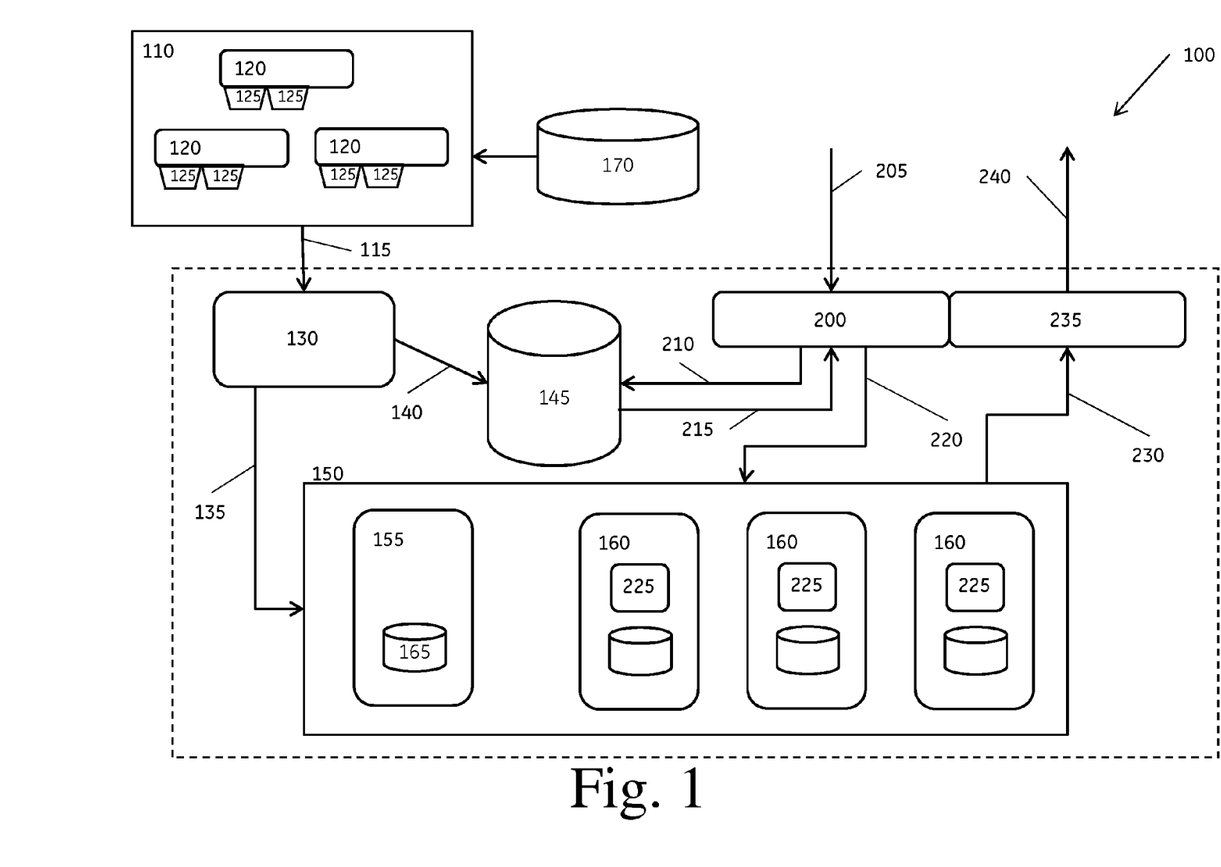
FIG. 1 is a schematic illustration of the logical system architecture in accordance with one embodiment of a storage and query system as described herein.

One embodiment of a system in accordance with the description herein is shown in FIG. 1. A storage, query and analysis system 100 is shown. As will be discussed below, the various components illustrated in FIG. 1 include components that are described herein functionally. The functions described may be executed by dedicated hardware, or by processes running on other more general hardware. In general, throughout the description herein, "computing device" or "computer" will be used to refer to any computing hardware that is used to execute programs to perform the functions of any of the elements described.

The system 100 of FIG. 1 is fed information from a data generator 110, which may be part of the system in certain embodiments. The data generator produces time stamped data 115 that reflects an aspect of the assets 120 being monitored. As discussed above, the data generator can receive information from multiple sensors 125 associated with a single asset, as well as sensors associated with multiple assets. As each measurement or other reading is received, the data generator attaches an appropriate time stamp, if one was not already attached to the data. The data generator operates in real time (or as close to real time as possible) and generates a flow of data associated with the monitored assets.

The data generator 110 passes this time stamped data 115 to an ingester 130. The ingester receives the time stamped data and separates the data it receives into data blocks 135 and indices 140 that are associated with the data block. Each data block 135 contains time stamped information that shares a particular set of metadata. Metadata describes the data being stored, for instance, the source of the data (e.g., the asset 120 that generated the data), the sensor 125 type, the owner of the asset that generated the data, a time range that the data falls within, a profile of the asset that generated the data in the data block 135, and so forth. Metadata may even include information such as a particular previous query or request that generated the particular block of data (as will be discussed further below). Such metadata captures information that will be useful when identifying what type of information can be found within a particular data block.

The ingester 130 generates an index 140 for each data block 135 containing information that shares appropriate metadata. The index information generated by the ingester is sent to an index database 145. The data block 135 is passed to a time series database system 150 for storage.

In some configurations, the ingester 130 may receive information from multiple data generators 110 (only one is shown in FIG. 1 for simplicity). It is also possible in some variations that multiple ingesters (not shown) may operate within the same system. However, it is generally desirable that all metadata be stored as indices 140 in a single index database 145 for a system 100. The index database may be a relational database, or any other database system that is suited to storing the index information. Note that the index database does not generally contain the time series data itself (which is stored in the data blocks 135), but only contains metadata that can be applied to an entire data block. As a result, the amount of information that is passed to the index database for a given volume of actual time series data is significantly smaller in volume, and can be processed quickly.

The time series database 150, shown in FIG. 1, is used to store the time series data in the data blocks 135. The time series database, which is also referred to as a time series data store, or TSDS, is formed logically from a control node 155 and one or more data nodes 160. These nodes are logical processes that are separated computationally from one another; however, in various embodiments, these nodes may either reside on the same computing hardware, or be separated onto multiple computing devices. As will be discussed below, the control node 155 may be on a separate computing device from all of the data nodes 160, may share a computing device with one data node, or may be located on the same computing device as all data nodes within the TSDS. The logical separation of these nodes allows for the scaling of the TSDS to use more hardware as the volume of data to be managed increases.

The control node 155 is responsible for assigning each incoming data block 135 for storage to a specific data node 160, and to keep track of which data blocks are stored on which data nodes. The control node in this way creates and stores a map 165 of the logical storage of data blocks within the TSDS. Once the control node decides which data node will store a given data block, the data block is passed to that data node and stored.

Because the control node 155 does not need to store the data blocks 135, and really does not need to process the data within the data blocks at all, the control node does not require the ability to process the entirety of the stored data. Similarly, because each data node 160 only needs to store the particular data blocks 135 that are assigned to it by the control node, no data node needs the ability to process the entirety of the stored data. Because these processing and storage loads are broken up in this manner, it is possible to construct a TSDS 150 that uses multiple machines to achieve storage capability with throughput that is many times greater than would be possible if a single device were used to handle the entire TSDS.

In addition, because the capability to handle greater volumes of data in the incoming data blocks 135 is increased with the additional of more computing devices to the TSDS 150 (to act as additional data nodes 160), the TSDS is scalable, without a need to change the process described herein, even if more computing hardware is added.

The portion of the system of FIG. 1 described so far addresses the storage of the data generated from any data generators 110 that feed the system 100. However, it is desirable that systems that process such volumes of time series data (often referred to as "historians") are also capable of performing data retrieval, and more importantly, analysis on such data. The architecture shown in FIG. 1 and described herein also provides improved ability to perform analytics on the stored data in response to custom queries, as will be discussed.

The system 100 of FIG. 1 also includes a query layer 200 that receives requests to extract subsets of data from the system and perform analysis on that data. The requests made to the query layer take the form of queries 205 that contain a set of criteria identifying the stored data that they wish to analyze, and some analysis that is to be performed on the retrieved results.

Criteria may include any type of selection logic based on the information that is associated with the stored data. Criteria used when extracting or analyzing time series data will often include particular time restrictions, for instance, data that was generated on a particular date between noon and 8 PM. Criteria may also include other information that identifies the particular data to be analyzed, for example: which assets 120 the data was generated from, what type of sensor 125 generated the data, which asset profiles should have their data searched, etc. In general, criteria that correspond to metadata that is stored in the index database 145 will result in the most effective use of the system described herein.

The analysis may be a mathematical or logical function that is to be performed on the data that meets the specified criteria. These might include, for instance: summation, averages, extreme values, deviations, and so forth.

The query layer 200 uses the criteria 210 that it receives to request from the index database 145 the identity of the data blocks 135 that may contain time series data that meet the criteria. When the criteria are compared to metadata of the types that are stored within the index database, it becomes possible to identify those data blocks which cannot contain time series data that is relevant to the query 205, and those that may contain data relevant to the query. The identifiers 215 of those data blocks which are relevant are sent back to the query layer.

The query layer 200 then prepares a sub-query 220 that can be performed on the data within each data block 135 that potentially contains relevant data (as identified by the data block identifiers 215 returned from the index database 145). The sub-query will contain the criteria 210 received in the original query, as well as a logical operation that should be performed upon the data matching the criteria in each data block 135. This logical operation is based upon the analysis requested in the original query 205, but may not be identical. For instance, if the analysis requested was an average value in the query, the sub-query 220 might have a logical operation that requested an average of the data matching the criteria and a count of the number of elements matching the criteria; both of these pieces of information are needed to reconcile the sub-averages from each data block into a final average. This is discussed further below.

The sub-query 220 is then sent to the TSDS 150 along with the list of data blocks 215 that contain relevant data. The TSDS receives this sub-query at the control node 155, and then uses the information in the storage map 165 regarding which data nodes 160 contain which data blocks 135 to pass the sub-query request on to each data node that contains the appropriate data blocks.

The data nodes 160 that receive the sub-query 220 process the sub-query using an evaluator 225 process. The evaluator reads the indicated data block 135 and performs the logical operation specified in the sub-query on all data in the data block that matches the criteria 210. Each data block will contain a different subset of data that matches the criteria, and each evaluator will process that subset and produce a sub-result 230 that includes the result of applying the logical operations to the subset of matching data in its data block. Note that for simple requests for data, or for analytic queries that cannot be broken down into sub-operations (because the raw data requires analysis as a body), the sub-results will consist of the raw portions of the data blocks that contain the requested information. In such cases, no processing of logical operations will take place at the evaluator.

The evaluator 225 will then pass this sub-result 230 back to an output handler 235. In some embodiments the output handler is part of the query layer 200. The output handler will receive the sub-results 230 produced from each of the evaluators 225 corresponding to data nodes 160 that contained data blocks 135 with relevant data, and will process this data into a final query result 240.

For example, in the case discussed above where the original query requested an average (analysis) of the data associated with a particular asset over a particular time (criteria), the sub-query would include the asset and time criteria, as well as logical operations of an average and a count of matching data points. When this sub-query was executed by each evaluator on the data nodes that contained data blocks that the index database indicated contained possibly matching data, the evaluators would each produce an average value for the matching data within their data block, and a count of the matching data within their data block. This average and count would be passed to the output handler.

The output handler would then average the received sub-results, weighting each average value provided by the count of the data points that the average represented. The end result is an average of all of the data that matches the criteria across all data blocks within the system. However, in cases such as this where the output handler did not have to receive or process any of the individual data that matched the criteria, handling only the pre-processed sub-results, it could operate quickly and without requiring very high data volume. This benefit may not be realized in all circumstances, for instance when the analysis requires collecting the entire body of data results prior to any processing (or when a query that simply requests data is made). Similarly, because the TSDS only had to run the sub-query on those data nodes that the control node indicated contained data blocks with potentially useful data, the data nodes could share the search and calculation load, and there was no need to transfer data between data nodes.

As a result, the final result 240 generated is produced with lower levels of system overhead and network traffic within the system, which provides for several benefits. Firstly, in embodiments that make use of criteria 210 that match metadata stored in the index database 145, it is often possible to minimize the number of different data blocks 135 that must be accessed, which improves performance speed. Secondly, in embodiments that make use of multiple data nodes 160, computation is shared among the evaluators 225 on each node, also improving system response speed. By not having to move the individual data blocks across multiple nodes for collective processing in one central location, network traffic is minimized, avoiding network bottlenecks that could slow down the speed of generating query results.

Finally, because bottlenecks are avoided in data traffic and computation and searching within the data blocks 135 is distributed, the system 100 as a whole can process requests 205 involving larger amounts of data by adding more machines to the TSDS 150. This scalability allows for the system as a whole to be configured in a way that can be tailored to the uses expected. It also allows for the system to grow as greater demands are placed on the system, due to increased numbers of assets or sensors, higher sampling rates, or accumulating data over a long operational period.

Figure 2:
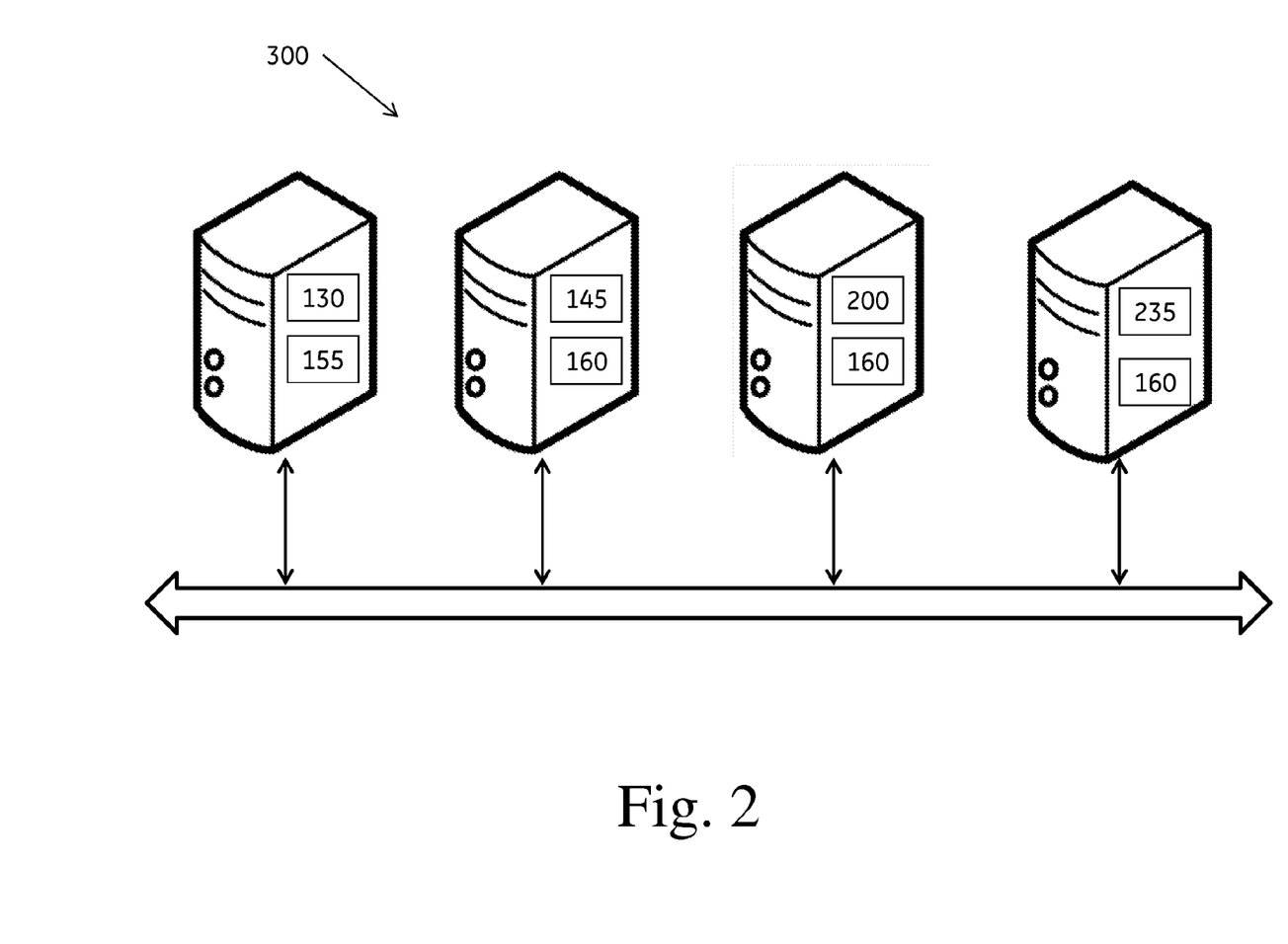
FIGS. 2-4 show schematic illustrations of specific arrangements of computing devices that may be used in various exemplary embodiments of systems corresponding to the logical systems of FIG. 1.
Figure 3:
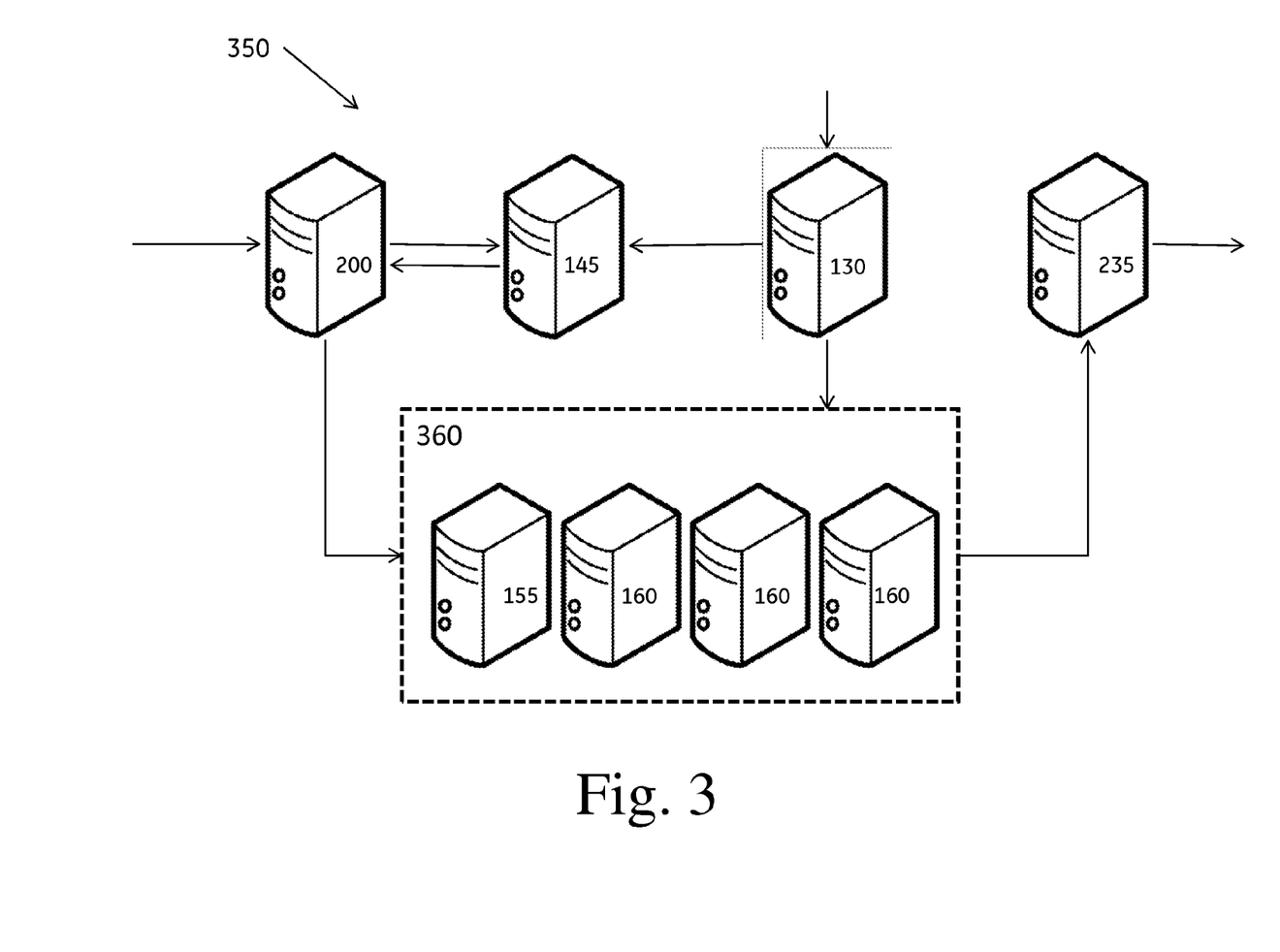
Figure 4:
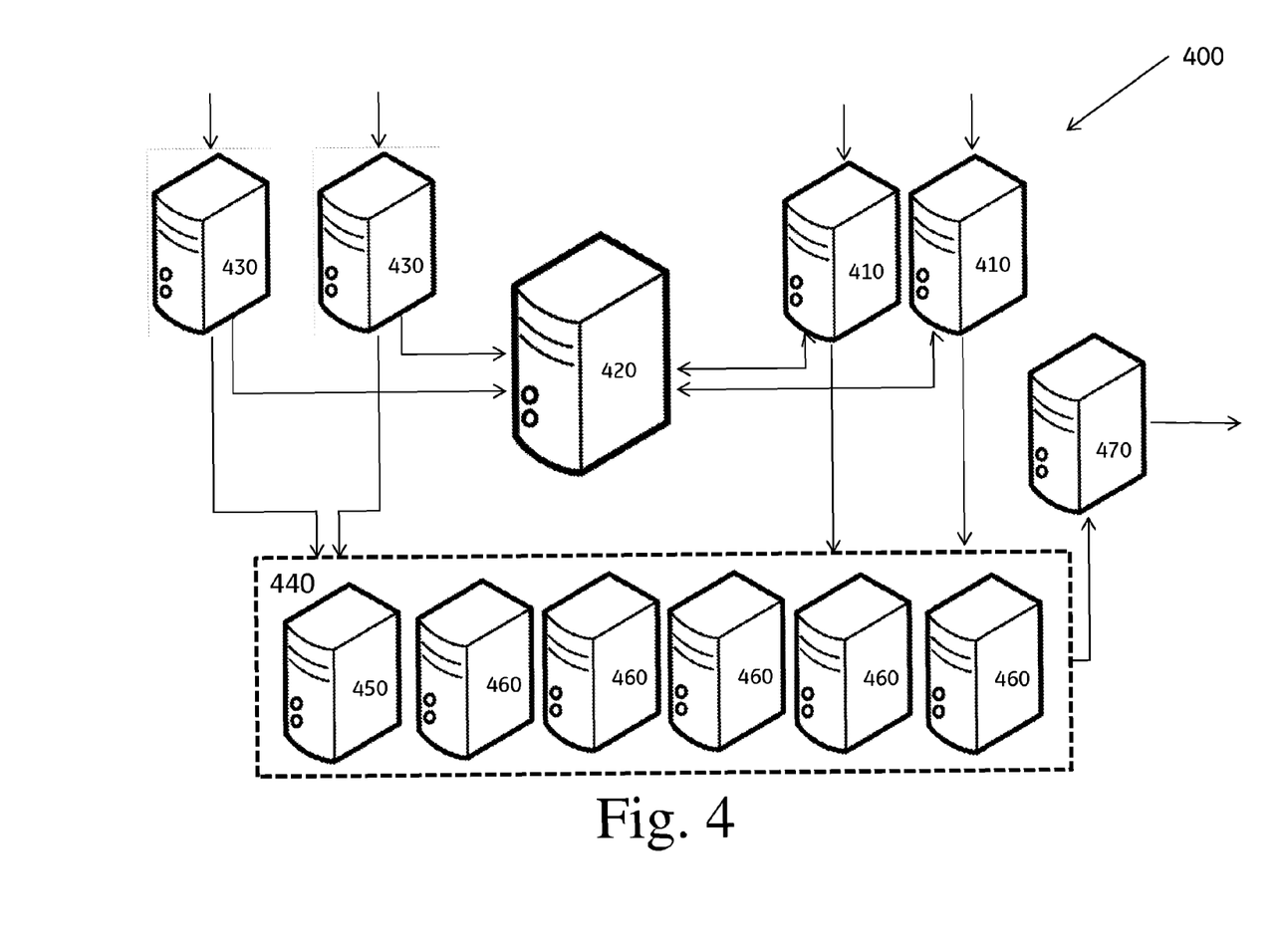

Examples of various ways that storage and analysis systems in accordance with various embodiments are shown in FIGS. 2, 3 and 4. FIG. 2 shows a system 300 that includes a TSDS that has three data nodes and a control node distributed across four computing devices. The ingester, query layer, index database and output handler are also distributed across these same four computing devices.

FIG. 3 illustrates an embodiment of the described system 350 where the ingester, query layer, and index database each run on separate computing devices from each other, and also run on separate computing devices from the TSDS 360, which is implemented across four devices, similar to the TSDS 150 of FIG. 2.

FIG. 4 illustrates a system configuration 400 with multiple query layers 410 running on separate machines, and an index database 420 on its own machine. Multiple ingesters 430 feed data to the index database and a TSDS 440 comprising six devices (one control node 450 and five data nodes 460, each on separate devices). The TSDS returns sub-results to a single output handler 470 for preparation of a final result. It should be appreciated that different configurations will provide different levels of benefit depending on the amount of data to be stored at any given time, the nature of the queries and analysis run on the data, and the structure of the data itself.

Also, it should be recognized that the distribution of information across various logical structures that can be implemented on multiple computing devices can provide for a degree of fault-tolerance as well as scalability.

In addition to the systems described with respect to FIGS. 1-4, above, variations on the logical system structure can also be made within the scope of the concepts described. For instance, FIG. 1 shows that the ingester 130 may be configured to receive data read from an existing external database 170 of time series data. Such an approach may be useful when existing systems that are not scalable are to be replaced by a query and analysis system 100 as described herein. By reading the data from the external database 170 and then processing it into data blocks 135 with appropriate metadata associated with the data blocks being stored in the index database 145, conversion of unsuitably structured data can be performed.

In addition, query results 240 that are generated by the system may be passed out of the system in various forms. In one embodiment, a final result is formatted and presented directly to a user via a user interface (not shown). In another embodiment, the analytic result is delivered as a set of time series data itself, and can either be delivered to external systems (not shown) for further processing, or fed back into the ingester 130 for storage within the system 100. Such storage of previous results with appropriate metadata can help in generating results for future queries and for composing compound queries that are dependent on previous results, without the need to execute the prior queries each time.

Figure 5:
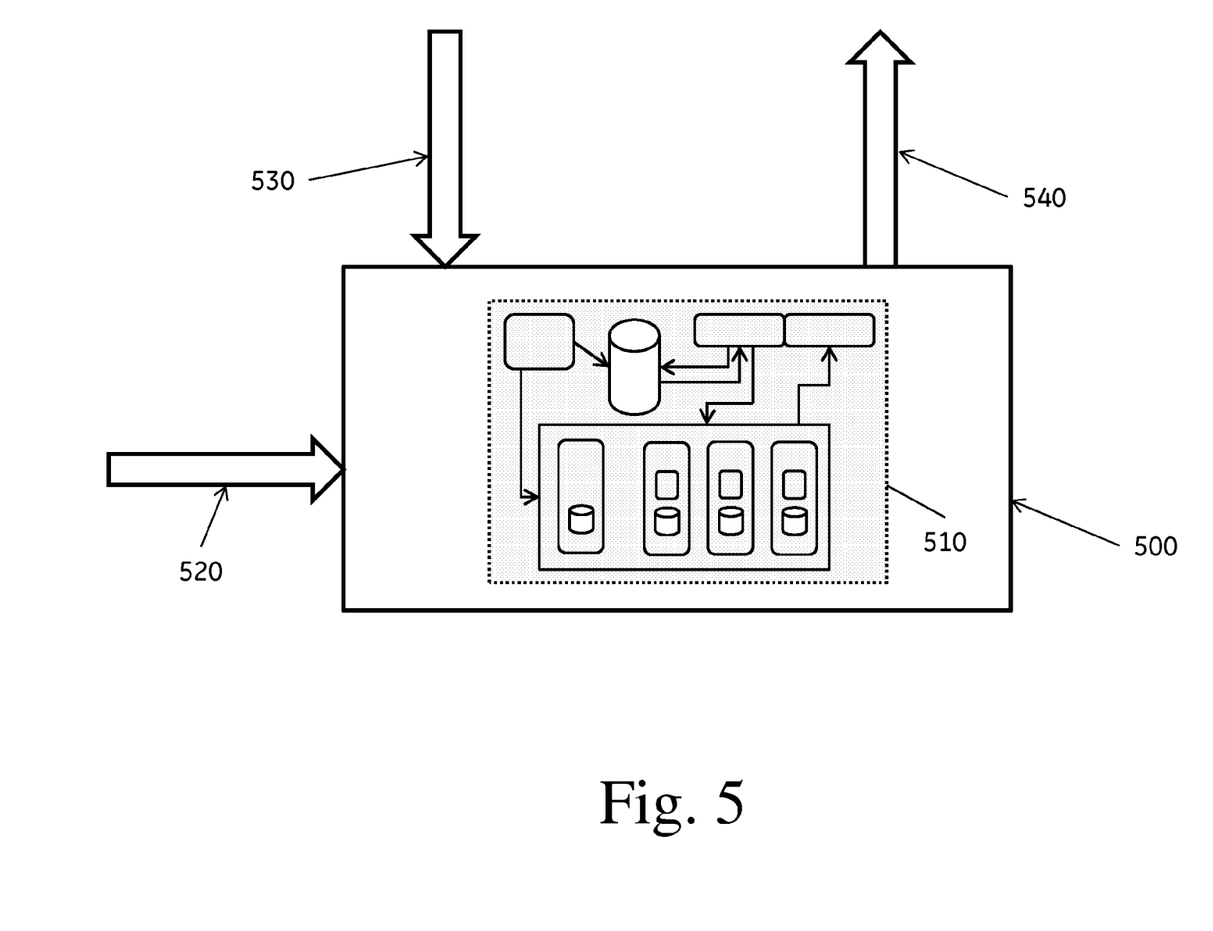
FIG. 5 is a schematic illustration of a service architecture in accordance with one embodiment of a storage and analytic service as described herein.

The flexibility provided in such a logical architecture as shown in FIG. 1 also allows the system 100 to be run in a way that offers time series data storage and analytics as a service, without the need for dedicated database hardware to be run by the customer. A schematic of such a service is shown in FIG. 5 and discussed below.

The service is a functional offering that may reside remotely from the users. As shown in FIG. 5, the entire service 500 is a closed box as viewed by a user of the service, who has access only to the inputs and outputs of the service offered. Such an arrangement may also allow the service to be packaged as a single appliance or turnkey system 510 that may be run by a service provider, and changed as needed to maintain or improve performance capabilities without a need to alter the service offerings as provided to the service customers.

The service 500 provides a data pipe 520, to which a customer's data generators (not shown) may be connected for storage of the data produced by the generators. The data, once passed to the service across the data pipe, which may be implemented as any type of network or other remote connection, are passed to the ingester (or multiple ingesters in alternate embodiments) of the service provider. Once received, the data passed into the service are handled by the system in the same manner as described above with regard to FIG. 1. The appliance or system 510 that is operated by the service provider may be implemented as any one of the system 100, 300, 350, 400 architectures described above in FIGS. 1-4, or as any other variation that makes use of any of the architectures described above.

A query pipe 530 is also connected to the service 500, and a requestor may send query requests to the system via such a connection. Similar to the arrangement of the ingester to the data pipe 520, the query pipe is connected to the query layer (not shown). The query layer of the service handles received queries as described above, with the results being prepared by the system or appliance of the service provider.

Once a final result is produced by the output handler, the service provider has the output handler pass the result back to the requestor via a result pipe 540. The requestor may process this data as they see fit, including resubmitting it to the data pipe 520 for storage by the service 500 if desired.

Although not required by such a service 500, the model of use provided by offering the storage and analysis as a service can provide benefits not only to particular customers who do not want to run their own systems, but also because the data provided via service may span multiple devices, equipment owners, data sources and so on. Although these users may consider their own data and queries to be entirely separate from other users of the system (and they would not generally be provided with access to the data of others), there may be other users who can benefit from being able to run analytics across the body of data that spans multiple service customers.

For example, multiple local power utilities may run equipment bought from a single source, and may contract with the supplier to provide maintenance through a service agreement. If the supplier wished to use the data generated by the equipment to perform prognostics and other analysis to assist in maintenance, diagnostics and repair of each utility's equipment, either a system as described above could be run for each utility, or each utility could subscribe to such a service. This would allow for analysis of each utility's equipment.

However, if all such data were stored in a way that was transparent to the supplier—for instance if the supplier were the data service provider as well—not only could the supplier execute on each the service contract for each utility exactly as if separate instances of the system were run for each utility, but certain benefits could be realized for both the utilities and the supplier. The use of a single, larger system would provide fault-tolerance and excess processing capability that could improve response times for all users. A greater degree of fault tolerance could be achieved without the need for separate instances being individually made redundant.

In addition to these benefits, the supplier could compare data across its customers' equipment. This could provide insight into improving the operation of the equipment, as well as better predicting maintenance needs across the fleet, and producing better compliance with its service obligations.

In various such embodiments, it may be desired to use the query and index database to provide for authentication and authorization functions. This allows each user to see their own data within the system, but prevents them from receiving results based on data to which they do not have permission. This also allows for other access restrictions, based on factors such as service level purchased (advanced analytics costing more), ownership of data, regulations (for instance HIPAA or other regulations regarding data privacy and access), etc.

The various embodiments described herein may be used to provide more effective storage and analysis of time series data. They may also be used to provide scalable systems that can be used to provide service to large client bases. Any given embodiment may provide one or more of the advantages recited, but need not provide all objects or advantages recited for any other embodiment. Those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description may enable those of ordinary skill in the art to make and use embodiments having alternative elements that likewise correspond to the elements of the invention recited in the claims. The scope of the invention thus includes structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. Thus, it is intended that the scope of the invention disclosed should not be limited by the particular disclosed embodiments described above, but should be determined only by a fair reading of the claims that follow.

What is claimed is:

1. A method for performing queries on a distributed time series data storage system having a time series database that stores data blocks containing time stamped data across a plurality of computing devices, and an index database that stores an index associated with the time stamped data in each data block, the method comprising:
   sending a query to a query layer running on a first computing device, the query specifying criteria that define a set of data retrieved from the time series data storage system and an analysis performed on the set of data;
   requesting from the index database the indices associated with the data blocks stored in the time series database needed to evaluate the query;
   returning the indices back to the query layer;
   preparing a sub-query that produces appropriate data matching the criteria, the sub-query including the criteria and a logical operation performed on the data matching the criteria;
   forwarding the sub-query to an evaluator running on each of the plurality of computing devices that are identified in the returned indices as holding data corresponding to the data blocks needed to evaluate the query;
   evaluating the criteria specified in the sub-query in each evaluator with respect to the data blocks stored on the same computing device on which the evaluator is running in order to select a subset of data;
   performing the logical operation specified in the sub-query in each evaluator on the subset of data generated in that evaluator in the evaluating step above to generate a sub-result;
   receiving each sub-result from each evaluator at an output handler; and
   combining the sub-result from each evaluator into a query result.

2. The method of claim 1 wherein the time series data storage system further comprises a data generator that produces the time stamped data and an ingester, and wherein the method further comprises:
   receiving the time-stamped data from the data generator by the ingester;
   creating the data block and the index from the time-stamped data;
   sending the data block to the time series database for storage; and
   sending the index to the index database for storage.

3. The method of claim 2 wherein the data generator comprises a plurality of sensors measuring operational parameters of a plurality of assets in real time.

4. The method of claim 2 wherein the data generator receives existing time series data from an external database.

5. The method of claim 2 further comprising:
   sending the query result to the ingester for storage within the time series database.

6. The method of claim 1 wherein the index describes metadata associated with the time stamped data.

7. The method of claim 6 wherein the metadata includes at least one of the following types of information:
   the asset generating the data in the data block;
   the sensor type associated with the data in the data block;
   an asset profile associated with the data in the data block;
   a time range covered by the data in the data block;
   a query associated with the data in the data block;
   an owner associated with the data in the data block; and
   a security setting associated with the data in the data block.

8. The method of claim 1 wherein the time series database comprises:
   a plurality of data nodes, each consisting of one of the plurality of computing devices, on which specific data blocks are stored; and a control node configured to choose which data node will store each data block and to record which data blocks are stored on each of the plurality of data nodes.

9. The method of claim 8, wherein the control node and each of the plurality of data nodes run on a separate one of the plurality of computing devices.

10. The method of claim 8, wherein an evaluator is running on each data node of the time series database.

11. The method of claim 8, wherein control node is configured to assign storage of each data block to multiple data nodes.

12. The method of claim 1, wherein the index database is running on one of the plurality of computing devices.

13. The method of claim 1, wherein the index database is running on the same one of the plurality of computing devices as the control node of the time series database.

14. The method of claim 1, wherein the query layer is running on one of the plurality of computing devices.

15. The method of claim 1, wherein the time stamped data is associated with the behavior of a plurality of assets.

16. A non-transitory computer readable medium containing program instruction for execution on a general purpose computing device, wherein execution of the program instructions by one or more processors of a computer system causes the one or more processors to perform queries on a distributed time series data storage system having a time series database that stores data blocks containing time stamped data across a plurality of computing devices, and an index database that stores an index associated with the time stamped data in each data block, the one or more processors performing said queries by carrying out operations comprising:
   sending a query to a query layer running on a first computing device, the query specifying criteria that define a set of data retrieved from the time series data storage system and an analysis performed on the set of data;
   requesting from the index database the indices associated with the data blocks stored in the time series database needed to evaluate the query;
   returning the indices back to the query layer;
   preparing a sub-query that produces appropriate data matching the criteria, the sub-query including the criteria and a logical operation performed on the data matching the criteria;
   forwarding the sub-query to an evaluator running on each of the plurality of computing devices that are identified in the returned indices as holding data corresponding to the data blocks needed to evaluate the query;
   evaluating the criteria specified in the sub-query in each evaluator with respect to the data blocks stored on the same computing device on which the evaluator is running in order to select a subset of data;
   performing the logical operation specified in the sub-query in each evaluator on the subset of data generated in that evaluator in the evaluating step above to generate a sub-result;
   receiving each sub-result from each evaluator at an output handler; and
   combining the sub-result from each evaluator into a query result.

17. The non-transitory computer readable medium of claim 16 wherein the time series data storage system further comprises a data generator that produces the time stamped data and an ingester, and wherein the method further comprises:
   receiving the time-stamped data from the data generator by the ingester;
   creating the data block and the index from the time-stamped data;
   sending the data block to the time series database for storage; and sending the index to the index database for storage.

18. The non-transitory computer readable medium of claim 16 wherein the time series database comprises:
   a plurality of data nodes, each consisting of one of the plurality of computing devices, on which specific data blocks are stored; and
   a control node configured to choose which data node will store each data block and to record which data blocks are stored on each of the plurality of data nodes.

19. A non-transitory computer readable medium comprising program instruction for execution on a general purpose computing device, wherein execution of the program instructions by one or more processors of a computer system configures the one or more processors to perform operations comprising:
   receive a query at a query layer running on a first computing device, the query specifying criteria that define a set of data retrieved from the time series data storage system and an analysis performed on the set of data;
   request from an index database indices associated with data blocks stored in a time series database needed to evaluate the query, the time series database comprising a control node and a plurality of data nodes;
   receive the indices back to the query layer;
   prepare a sub-query that produces appropriate data matching the criteria, the sub-query comprising the criteria and a logical operation performed on the data matching the criteria;
   forward the sub-query to an evaluator running on each of the plurality of data nodes that are identified in the returned indices as holding data corresponding to data blocks needed to evaluate the query;
   evaluate the criteria specified in the sub-query in each evaluator with respect to data blocks stored on the same computing device on which the evaluator is running in order to select a subset of data;
   perform the logical operation specified in the sub-query in each evaluator on the subset of data generated in that evaluator in the evaluating step above to generate a sub-result;
   receive each sub-result from each evaluator at an output handler; and
   combine the sub-result from each evaluator into a query result.

20. The non-transitory computer readable medium of claim 19 wherein the query and index database is used to provide for authentication and authorization of requestors submitting queries.

* * * * *

UNITED STATES PATENT AND TRADEMARK OFFICE
CERTIFICATE OF CORRECTION

PATENT NO. : 9,152,672 B2  
APPLICATION NO. : 13/716560  
DATED : October 6, 2015  
INVENTOR(S) : Lin et al.

Page 1 of 1

It is certified that error appears in the above-identified patent and that said Letters Patent is hereby corrected as shown below:

Title Page, Item (72), in "Inventors", in column 1, line 6, delete "Scdhenectady" and insert --Schenectady--, therefor On page 2, in column 2, under "Other Publications", line 6, delete "IE EE" and insert --IEEE--, therefor Signed and Sealed this  
Sixteenth Day of August, 2016

Michelle K. Lee  
*Director of the United States Patent and Trademark Office*